2 Sheets—Sheet 1.

P. HINKLE.

HYDRAULIC JACK.

No. 7,247. Reissued Aug. 1, 1876.

Witnesses

Geo. H. Strong.

Jno L. Boone

Inventor

Philip Hinkle by Dewey & Co

Attys.

2 Sheets—Sheet 2.

P. HINKLE.

HYDRAULIC JACK.

No. 7,247.

Reissued Aug. 1, 1876.

Witnesses

Geo. H. Strong

Jno. L. Boone

Inventor

Philip Hinkle by Dewey & Co

Attys

UNITED STATES PATENT OFFICE.

PHILIP HINKLE, OF SAN FRANCISCO, CALIFORNIA.

IMPROVEMENT IN HYDRAULIC JACKS.

Specification forming part of Letters Patent No. 164,300, dated June 8, 1875; reissue No. 7,247, dated August 1, 1876; application filed April 15, 1876.

*To all whom it may concern:*

Be it known that I, PHILIP HINKLE, of San Francisco city and county, State of California, have invented Improvements in Hydraulic Elevators; and I do hereby declare the following description and accompanying drawings are sufficient to enable any person skilled in the art or science to which it most nearly appertains to make and use my said invention or improvement without further invention or experiment.

My invention relates to certain improvements in hydraulic elevators, and the working parts connected therewith, by which I am enabled, first, to make the cage open and close the doors at the different landings automatically by its rise and fall.

My invention also consists of a novel device for changing the power and adapting it to heavy or light loads.

Figures 1, 2:
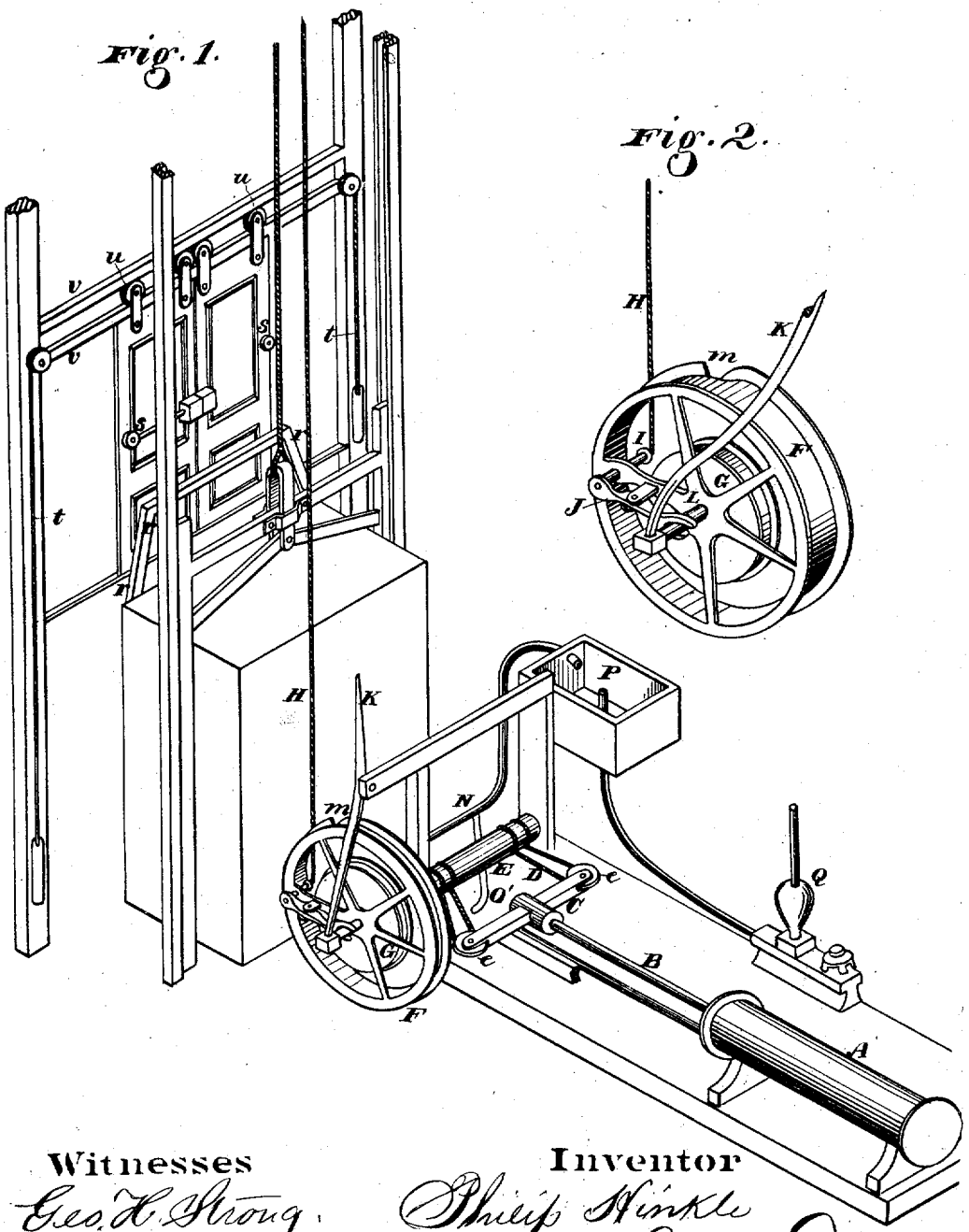
Figure 3:
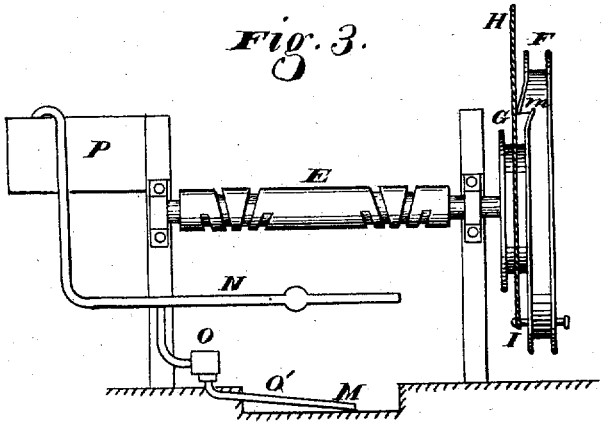
Figure 4:
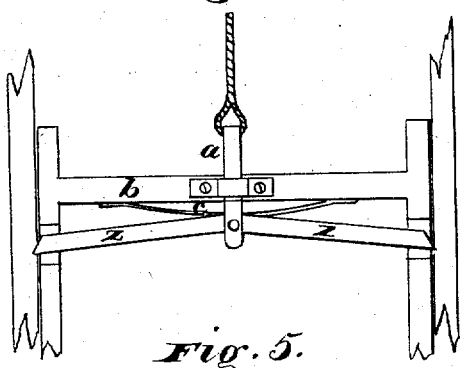
Figure 5:
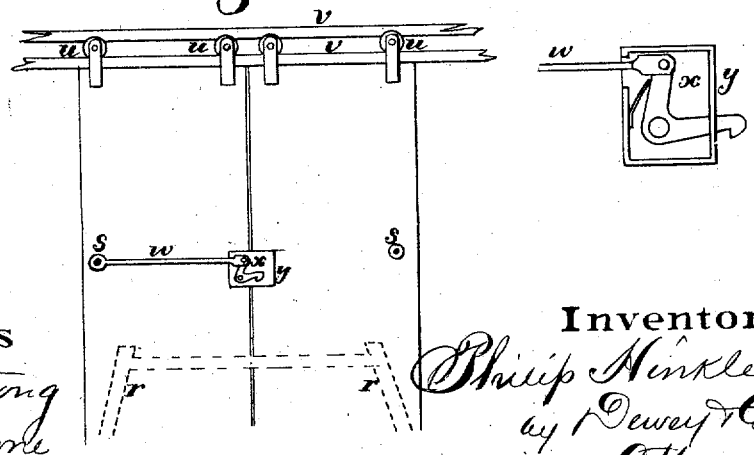

Referring to the accompanying drawings for a more complete explanation of my invention, Figure 1, Sheet 1, is a perspective view of my invention. Fig. 2 is an enlarged view of the double hoisting-pulley. Fig. 3, Sheet 2, is a view of the pulley, drum, and water-exhaust. Fig. 4 is a view of the safety-catch. Fig. 5 shows the door and lock. Fig. 6 shows the lock.

A is a horizontal cylinder, having within it a piston moved by the pressure of water, which is admitted by suitable valves. B is the piston-rod, having a cross-head, C; and to this cross-head the pairs of ropes or chains D are attached, passing around pulleys *e* in the ends of the cross-head, so as to equalize the strain upon them. The cross-head is also loosely secured to the piston-rod, and assists to equalize the strain upon the ropes in the same manner as described in my patent granted July 1, 1873. The opposite ends of the ropes D pass around the drum E, winding in the spiral grooves, as shown.

In some cases I employ a swiveling-bar at each end of the cross-head or yoke C, and a pulley at each end of these bars, making four pulleys and eight parallel ropes. By this combination of my swiveling yoke or yokes with the pulleys I am enabled to employ any number of ropes, which can be made correspondingly smaller, and the strain upon all of the ropes will be equal. If either of the ropes break the others will hold until this can be repaired.

The spiral grooves in the drum are made in pairs, so that the pairs of ropes from each pulley will be close together when the yoke is farthest from the drum, and will coil outward from each other, so as to lie nearly parallel when the yoke is close to the drum.

The elevator-pulley is secured to this drum-shaft, and consists of two different-sized wheels, F and G, provided with a device for shifting the rope H which hoists the cage, so that for light loads the rope may be coiled upon the larger pulley F; and thus the cage may be hoisted to its highest point with a movement of the piston through only a small part of the length of the cylinder, and a consequent saving of water.

When a heavy load is to be raised the rope may be allowed to coil upon the smaller pulley G, and the piston will then traverse the full length of the cylinder.

In order to shift the rope H readily from one pulley to the other, it is secured to a strong pin, I, which slides through a boss upon one of the arms of the pulley F. A lever, J, has its fulcrum upon the outside of this arm, and one end is secured to the pin I, while the other clasps a collar upon a pin, L, which loosely enters the center of the wheel-hub, so that the lever J can turn around with the wheel, and still be operated by means of the hand-lever K, which is attached to the pin L, and extends up to the frame within easy reach, or it may enter the corner of the cage.

The flange of the pulley F, which is nearest to the pulley G, is bent down and grooved, as shown at *m*, so that when the pin I is drawn outward, so that the rope H lies close to the pulley F, it will be caught by this projecting lip and caused to coil upon the large pulley; but when the pin is forced inward the rope will coil upon the small pulley without touching the lip.

The pipe N, by which the water escapes from the cylinder, is provided at O with my relief-valve, for which application for a patent was granted March 23, 1875, and the pipe of the valve has an extension, O′, which draws up any water which leaks into the tank or depression in the manner of an injector. The water escapes into the tank P, which is situated just high enough to allow the water to run a hydraulic ram, Q, as shown. This ram forces a certain proportion of the water up into an elevated tank, so that it may be used sometimes to run the hoisting-cylinder, and save some expense of water.

In order to operate the doors at the different landings automatically, and prevent the danger of their being opened at improper times, while they are always opened when the cage arrives, I fix two pairs of arms, *r r*, to the front of the cage. These arms approach each other both upward and downward from the center, which is the widest part, and as the cage arrives at any door these arms engage rollers *s s'*, which project from the back of the doors, and, after unlocking the doors by the first contact, they press them apart so that they are wide open when the cage has arrived at the level of the landing, and they will be closed after the cage passes by ropes *t* properly attached, and extending to springs or weights at the side, as shown. The doors are mounted upon rollers *u* at the top, and these rollers move between parallel tracks V, so that there will be no jar or catch.

The unlocking device is constructed as follows: The roller *s* is mounted upon a shaft, which is pivoted within the thickness of the door, so that the roller may have a little motion from side to side, and, as the arm *r* strikes this roller an instant before the opposite roller is touched, it will be thrown back a short distance. An arm, W, extends from the roller-shaft to the inner edge of the door, and connects with one arm of a bell-crank lever, X. The other arm of the lever is formed into a catch, and it is held down by a spring, so as to engage with the holder *y* upon the opposite door at all times until the roller is forced back by the contact of the arms *r*. This frees the catch, and the doors will then be opened by the further action of the arm *r* upon the rollers *s s'*.

It will be readily seen that the arrangement of the inclines and rollers upon the cage, and the landing doors, and also the mechanical devices for operating the locks, may be reversed without essentially changing the features of my invention, which consist in automatically opening, unlocking, and locking the doors by the upward and downward movements of the cage.

The safety-stop employed consists of two arms, Z Z, which extend across the top of the cage and have their outer ends beveled off sharply, so that they will press into the guides, when they are in a straight line, and thus hold the cage in its place if the rope H breaks. The inner ends of these arms are attached to the bottom of the link *a*, the rope being secured to the top, and as the weight of the cage comes upon it the link will slide up until the inner ends of the arms Z touch the cross-beam *b*. This effectually prevents any contact between the ends of the arms and the guides as long as the rope holds. In order to insure the locking of this catch in case of accident, I fix a spring, *c*, beneath the beam *b*, and this spring presses constantly upon the center, where the arms Z meet, so that any relaxation of the rope will allow the spring to force the arms downward till their outer ends are fixed in the guides. These arms differ from those now in use, first, in being simple straight bars, while the others are made in the shape of a bell-crank lever; and, secondly, in not being pivoted or in any way attached to the frame, while the others must be pivoted or supported at the angle in order to work; and because of their shape and being pivoted, a rack upon the guides is necessary for them to engage with.

The arms Z Z meet at an obtuse angle in the center, forming a sort of knee-lever at this point; and it will be seen that when the rope breaks and the spring *c* acts to force the inner ends of the arms downward, they must slide outward until they are in a straight line, and their outer ends fixed in the wood of the guides. When this is done, the weight of the cage rests upon the arms, as upon a simple straight cross-bar, without any tendency of the arms to force the timbers apart, and I am also enabled to avoid the use of racks along the guides for the safety-arms to engage with, such as are used with the bent-lever safety-catches.

Having thus described my invention, what I claim, and desire to secure by Letters Patent, is—

1. The pulleys F and G, of different sizes, secured side by side upon the same shaft, the pulley F having a lip, *m*, in combination with the shipping mechanism, by which the rope can be run upon either one of the pulleys, substantially as and for the purpose set forth.

2. The lever J, having its fulcrum upon an arm of the pulley F, and attached to the pin I, together with the lever K and central pin L, for operating the lever J and shifting the rope H from one pulley to the other, substantially as herein described.

3. In combination with one or more swiveling cross-heads or yokes, C, the pulleys *e*, with the ropes D, in pairs and winding upon the drum E spirally, substantially as and for the purpose herein described.

4. The escape-pipe N, with the branch-pipe extension O', to draw away waste-water from the tank M and discharge it into the tank P, substantially as herein described.

5. The device consisting of the inclined planes or arms *r r*, secured to the cage, and the pulleys or rollers *s s'* upon the sliding doors, together with the cords *t*, and the weight or springs for opening and closing the doors as the cage arrives opposite to them, and departs, substantially as herein described.

6. The roller *s*, mounted upon a vibrating shaft, and the arm W, and bell-crank lever

*x*, so constructed as to operate as a latch, which is operated by the arm *r*, substantially as herein described.

7. A means for operating the doors at the different landings, the same consisting of a mechanism attached to the cage, whereby the doors are, by a positive motion from the cage, opened as the cage approaches the landings, substantially as set forth.

PHILIP HINKLE.

Witnesses:
GEO. H. STRONG,
JNO. L. BOONE.